United States Patent
Yu

(10) Patent No.: US 6,450,920 B1
(45) Date of Patent: Sep. 17, 2002

(54) METHOD OF CONTROLLING UPSHIFT FOR AN AUTOMATIC TRANSMISSION

(75) Inventor: Pyung-Hwan Yu, Suwon (KR)

(73) Assignee: Hyundai Motor Company, Seoul (KR)

(*) Notice: Subject to any disclaimer, the term of this patent is extended or adjusted under 35 U.S.C. 154(b) by 24 days.

(21) Appl. No.: 09/690,920

(22) Filed: Oct. 18, 2000

(30) Foreign Application Priority Data

Nov. 16, 1999 (KR) ............................. 99-50788

(51) Int. Cl.$^7$ ................................. F16H 61/08
(52) U.S. Cl. ........................... 477/154; 477/155
(58) Field of Search ........................... 477/138, 154, 477/155, 156, 160, 163; 475/118, 120, 123; 701/51, 66

(56) References Cited

U.S. PATENT DOCUMENTS

| | | | | |
|---|---|---|---|---|
| 5,376,056 A | * | 12/1994 | Wakahara et al. | 475/123 |
| 5,725,454 A | * | 3/1998 | Yasue et al. | 475/128 |
| 5,809,442 A | * | 9/1998 | Schulz et al. | 192/3.29 |
| 5,857,935 A | * | 1/1999 | Takiguchi | 475/120 |
| 5,873,803 A | * | 2/1999 | Geon | 477/156 |
| 5,931,885 A | * | 8/1999 | Kubo et al. | 475/123 |
| 6,041,275 A | * | 3/2000 | Takiguchi | 475/120 |

* cited by examiner

Primary Examiner—Charles A. Marmor
Assistant Examiner—Ankur Parekh
(74) Attorney, Agent, or Firm—Birch, Stewart, Kolasch & Birch, LLP

(57) ABSTRACT

Disclosed is a method for controlling runup comprising the steps performing upshifting from a second speed to a third speed if throttle opening and vehicle speed are at predetermined levels; determining if runup occurring at the point where upshifting from the second speed to the third speed is performed, the determination of the occurrence of runup being performed based on turbine rpm, transmission output rpm and a second speed gear ratio; determining if a time rate of change in turbine rpm is less than 0 if runup is occurring; reducing a duty for a predetermined time period if the time rate of change in turbine rpm is greater than 0; and performing feedback control if the time rate of change in turbine rpm is less than 0.

6 Claims, 3 Drawing Sheets

METHOD OF CONTROLLING UPSHIFT FOR AN AUTOMATIC TRANSMISSION

BACKGROUND OF THE INVENTION (a) Field of the Invention

The present invention relates to a method of controlling upshift for an automatic transmission, and more particularly, to a control method performed in real-time in which runup occurring during an upshift operation from a second speed to a third speed is controlled.

(b) Description of the Related Art

Runup is a phenomenon in which clutches in the transmission are temporarily not engaged following an increase in engine drive power such that engine rpm and turbine rpm abruptly increase. Runup occurs frequently during power on upshifting from a second speed to a third speed.

FIG. 1 shows a waveform diagram of engine rpm Ne, turbine rpm Nt and a duty ratio in a vehicle applying a conventional method for preventing runup. In the drawing, line 1 (dotted line) indicates engine rpm Ne; line 2 (solid line) indicates turbine rpm Nt; and line 3, which increases in steps then decreases, indicates a predetermined duty ratio.

In the conventional method, to prevent runup during power on upshifting from the second speed to the third speed, a time T of a predetermined interval A starting from a shift start point and extending to where feedback control is performed is measured, and a compensation time Tc is duty is then compensated according to a comparison between a target shift time Tst and an actual shift time.

However, because the compensated duty is used also for subsequent shift operations from the second speed to the third speed, optimal prevention of runup is not obtained.

SUMMARY OF THE INVENTION

The present invention has been made in an effort to solve the above problems.

It is an object of the present invention to provide a method for controlling runup during an upshift operation from a second speed to a third speed in which compensation to prevent runup is performed in real-time.

To achieve the above object, the present invention provides a method of controlling upshift for an automatic transmission comprising the steps of performing upshifting from a second speed to a third speed if throttle opening and vehicle speed are at predetermined levels; determining if runup is occurring at the point where upshifting from the second speed to the third speed is performed, the determination of the occurrence of runup being performed based on turbine rpm, transmission output rpm and a second speed gear ratio; determining if a time rate of change in turbine rpm is less than 0 if runup is occurring; reducing a duty for a predetermined time period if the time rate of change in turbine rpm is greater than 0; and performing feedback control if the time rate of change in turbine rpm is less than 0.

According to a feature of the present invention, the step of determining if runup is occurring, it is determined that runup is occurring if turbine rpm Nt are greater than a result of adding a first predetermined value of rpm to the product of the second speed gear ratio and the transmission output rpm.

According to another feature of the present invention, the first predetermined value of rpm is 100 rpm.

According to yet another feature of the present invention, the step of determining if runup is occurring further comprises the steps of determining a point at which feedback occurs if it is determined that runup is occurring; and performing feedback control if feedback is occurring.

According to still yet another feature of the present invention, the step of determining the point at which feedback occurs is performed by determining if turbine rpm Nt are greater than a second predetermined value of rpm subtracted from the product of the second speed gear ratio and the transmission output rpm.

According to still yet another feature of the present invention, the second predetermined value of rpm is 35 rpm.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
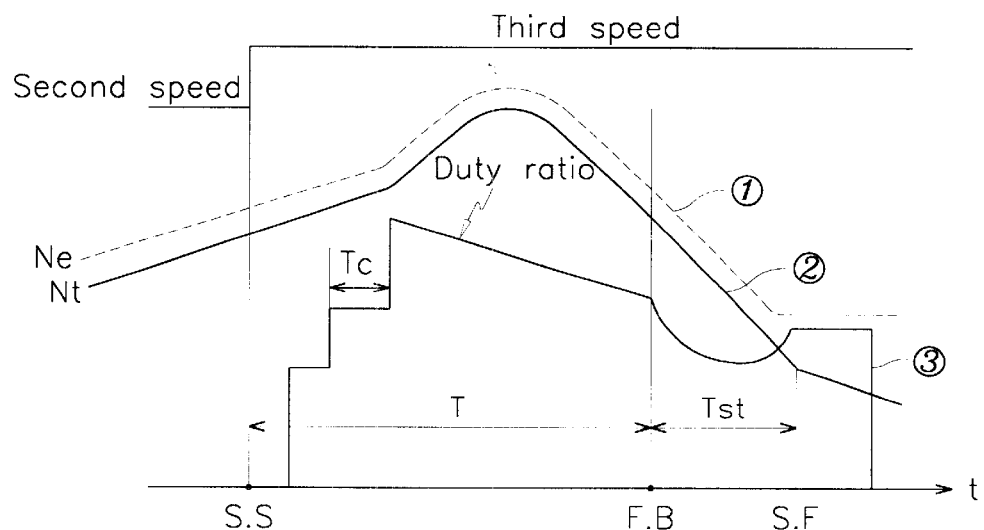
FIG. 1 is a waveform diagram of engine rpm Ne, turbine rpm Nt and a duty ratio in a vehicle applying a conventional runup prevention method.
Figure 2:
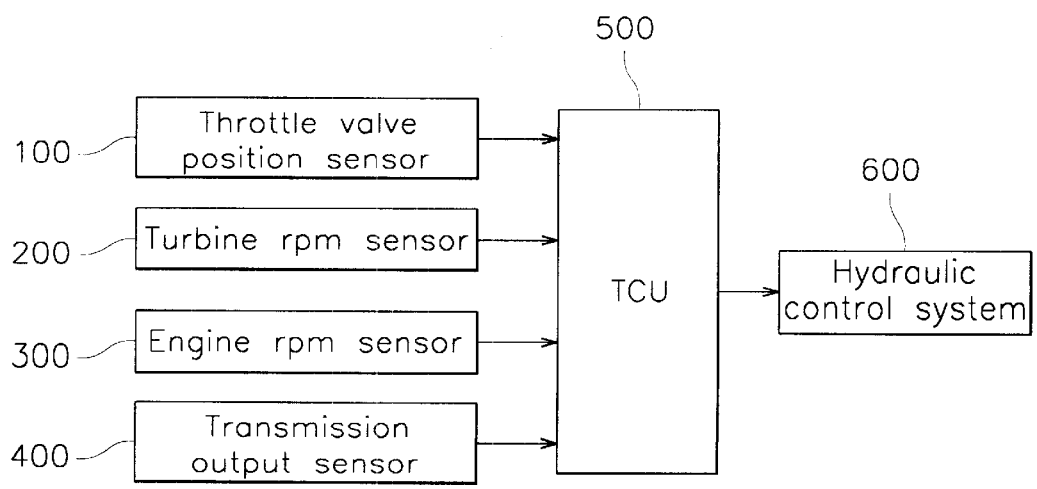
FIG. 2 is a block diagram of various elements of a vehicle having an automatic transmission to which the present invention is applied.

FIG. 2 shows a block diagram of various elements of a vehicle having an automatic transmission to which the present invention is applied.

Elements of the vehicle to which the method of the present invention is applied include a throttle valve position sensor 100, a turbine rpm sensor 200, an engine rpm sensor 300, a transmission output sensor 400, a TCU 500, and a hydraulic control system 600.

The throttle valve position sensor 100 detects throttle valve opening, which varies according to driver manipulation of an accelerator pedal, and outputs corresponding signals; the turbine rpm sensor 200 detects a rotational speed of a turbine of a torque converter and outputs corresponding signals, the turbine being connected to an input shaft of a transmission; the engine rpm sensor 300 detects a rotational speed of a crankshaft of an engine and outputs corresponding signals; the transmission output sensor 400 detects output rpm of the transmission and outputs corresponding signals, the output rpm of the transmission being varied in the transmission after receiving the rotational force of the turbine; the TCU 500 determines a point at which runup occurs during the upshift operation from the second speed to the third speed, and performs feedback control at a point where turbine rpm are at a maximum after outputting duty control signals for reducing a duty ratio at the point where runup occurs; and the hydraulic control system 600 performs hydraulic pressure control for shifting into the third speed from the second speed according to the duty control signals output from the TCU 500.

Figure 3:
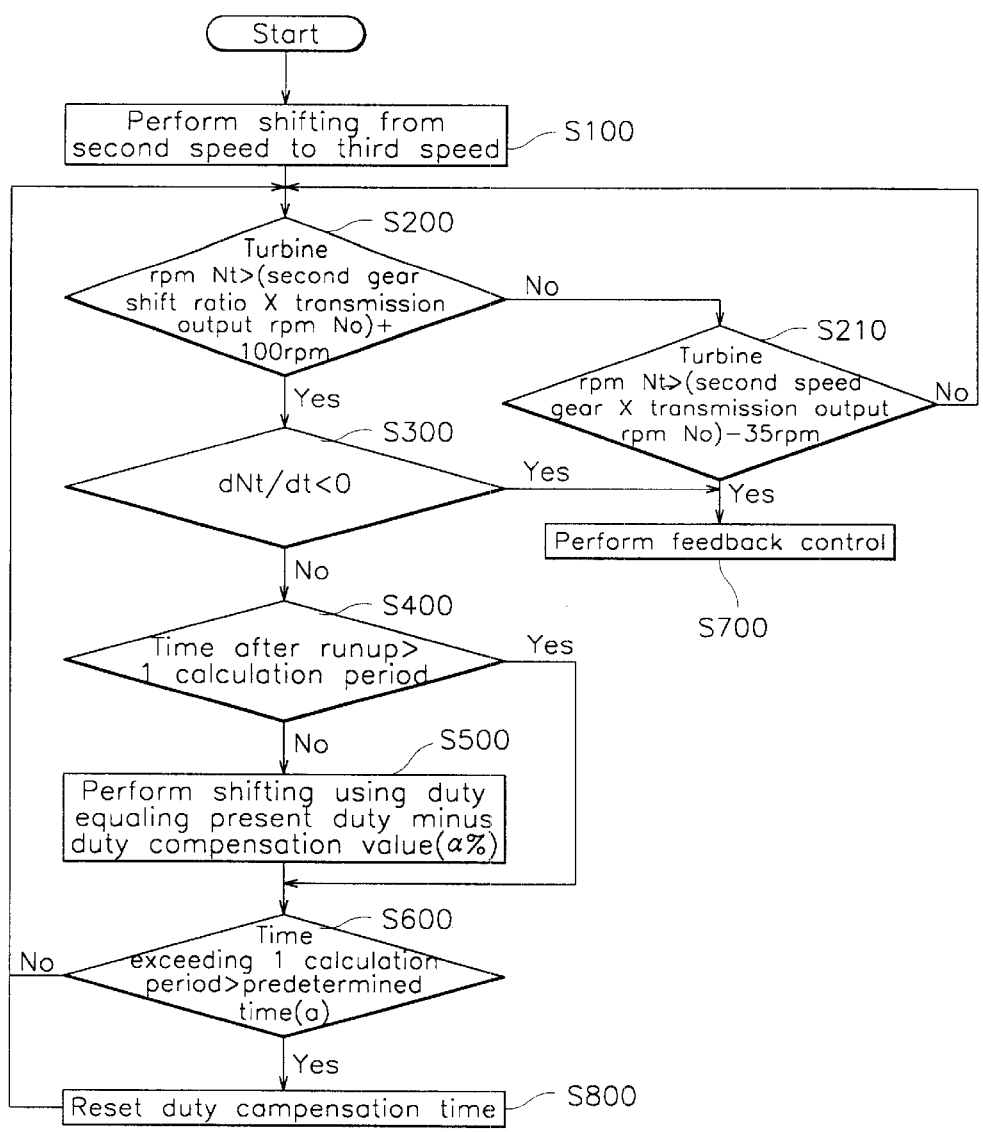
FIG. 3 is a flow chart of a runup control method according to a preferred embodiment of the present invention.

A method for controlling runup according to a preferred embodiment of the present invention will now be described with reference to FIGS. 3 and 4.

When driving in the second speed, if the driver continues to depress the accelerator pedal, the throttle valve position sensor 100 detects the increase in the opening of the throttle valve and transmits corresponding signals to the TCU 500. Using these signals together with detected vehicle speed and a test pattern, the TCU 500 determines whether power on upshifting from the second speed to the third speed needs to be performed. If it is determined that conditions are met, the TCU 500 outputs shift signals from a shift start point SS, and, simultaneously, outputs duty control signals to the hydraulic control system 600 such that shifting from the second to the third speed is effected in step S100.

The hydraulic control system 600 controls a line pressure of one or more solenoid valves according to the duty control signals output by the TCU 500 such that the operation of a 2–3 shift valve in the hydraulic control system is controlled. During such an operation, the turbine rpm sensor 200 and the engine rpm sensor 300 continuously gauge turbine rpm Nt and engine rpm Ne, respectively. Turbine rpm Nt and engine rpm Ne are as shown in FIG. 4.

Figure 4:
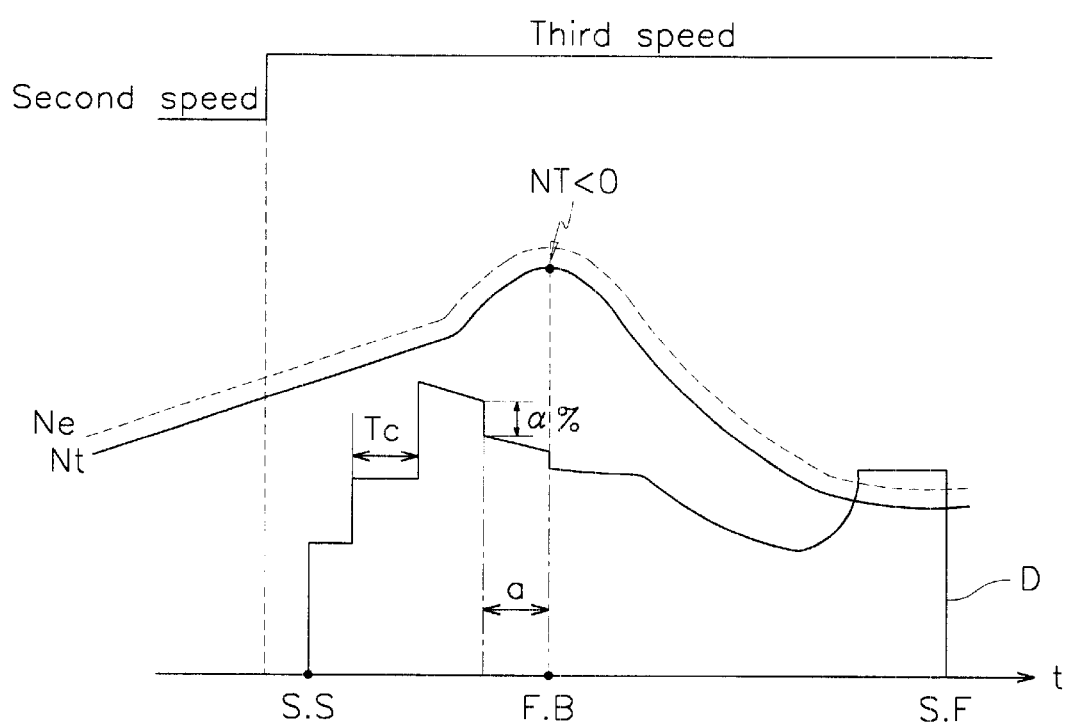
FIG. 4 is a waveform diagram of engine rpm Ne, turbine rpm Nt and a duty ratio in a vehicle applying the runup control method of the present invention.

As shown in FIG. 4, engine rpm Ne and turbine rpm Nt continue to increase after the shift start point SS, and a duty control signal D output from the TCU is controlled according to a predetermined pattern. In this state, the TCU 500, in order to determine if power on upshift runup is occurring, determines turbine rpm Nt, transmission output rpm No output from the transmission output sensor 400, and a second speed gear ratio. The TCU 500 then determines if turbine rpm Nt are greater than a result of adding 100 rpm to the product of the second speed gear ratio and the transmission output rpm No in step S200.

If it is determined that turbine rpm Nt are greater than the result of 100 rpm added to the product of the second speed gear ratio and the transmission output rpm No, the TCU 500 then determines if duty control conditions are met. That is, in step S300, the TCU 500 determines if turbine rpm Nt are decreasing or increasing at the point where runup is occurring since runup control need not be performed if turbine rpm Nt are decreasing. At this time, if it is determined if runup is occurring, the TCU 500 measures the elapsed time using an internal clock (not shown). Accordingly, such a determination by the TCU 500 whether turbine rpm Nt are decreasing or increasing is performed by calculating the derivative of turbine rpm Nt with respect to time, with a positive value indicating that turbine rpm Nt are increasing and a negative value indicating that turbine rpm Nt are decreasing.

In step S300, if the time rate of change in turbine rpm Nt are positive, the TCU 500 determines if the time passed from the start of runup exceeds one calculation period in step S400. A calculation period here refers to the amount of time used by the TCU 500 to receive a signal, perform calculations and obtain an output value. If the time passed is less than one calculation period, a duty compensation value (α%) corresponding to the derivative of turbine rpm Nt is subtracted from the present duty ratio, after which shifting is performed using the new duty ratio in step S500. In particular, the TCU 500 outputs compensated duty signals to the hydraulic control system 600, which controls solenoid valve line pressure according to these compensated duty signals to perform shifting.

On the other hand, if the time passed from the start of runup exceeds one calculation period in step S400, the TCU 500 determines if the amount surpassed is greater than a predetermined time (a) in step S600. Here, the time (a) can be varied as required. If the time exceeding one calculation period is greater than the time (a), the duty compensation operation is discontinued and a duty compensation time T1 is reset in step S800. Following step S800, the process is returned to step S200 in which the TCU 500 determines if turbine rpm Nt are greater than the result of 100 rpm added to the product of the second speed gear ratio and the transmission output rpm No. In step S600, if the time exceeding one calculation period is less than the time (a), the duty compensation time T1 is not reset and the process is returned directly to step S200.

In step S300, if turbine rpm Nt are decreasing at the point where runup is occurring, the TCU 500 performs feedback control identically as in prior art methods in step S700. Also, in step S200, if turbine rpm Nt are less than the result of adding 100 rpm to the product of the second speed gear ratio and the transmission output rpm No, the TCU 500 determines if turbine rpm Nt are greater than 35 rpm subtracted from the product of the second speed gear ratio and the transmission output rpm No in step S210. If this condition is met, step S700 of feedback control is performed. Step S210 is performed to determine a point where feedback occurs.

In the method of the present invention as described above, after turbine rpm Nt, transmission output rpm No and the second speed gear ratio are detected to determine if runup is occurring during power on upshifting from the second speed to the third speed, control is performed to reduce duty starting from the point at which runup occurs to a predetermined point in order to prevent the abrupt increase in engine rpm Ne. Accordingly, runup is controlled in real-time.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of controlling upshift for an automatic transmission when performing upshift from a second speed to a third speed if throttle opening and vehicle speed are at predetermined levels, the method comprising the steps of:

determining if runup is occurring at the point where upshifting from the second speed to the third speed is performed, the determination of the occurrence of runup being performed based on turbine rpm, transmission output rpm and a second speed gear ratio;

determining if a time rate of change in turbine rpm is less than 0 when runup is occurring;

reducing a duty ratio of a shift valve in a hydraulic control system of the automatic transmission for a predetermined time period when the time rate of change in turbine rpm is greater than 0; and performing feedback control of the duty ratio of the shift valve when the time rate of change in turbine rpm is less than 0.

2. The method of claim 1 wherein the step of determining if runup is occurring further comprises the steps of:

comparing the turbine rpm with a result of adding a first predetermined value of rpm to the product of the second speed gear ratio and the transmission output rpm; and determining that runup is occurring when the turbine rpm is greater than the result.

3. The method of claim 2 wherein the first predetermined value of rpm is 100 rpm.

4. The method of claim 1 wherein the step of determining if runup is occurring further comprises the steps of:

determining a start point of a feedback control when runup has not occurred; and initiating the feedback control at the start point.

5. The method of claim 4 wherein the step of determining the start point of the feedback control is performed by determining if the turbine rpm is greater than a second predetermined value of rpm subtracted from the product of the second speed gear ratio and the transmission output rpm.

6. The method of claim 5 wherein the second predetermined value of rpm is 35 rpm.

* * * * *